(12) United States Patent
Yan et al.

(10) Patent No.: US 8,661,525 B2
(45) Date of Patent: *Feb. 25, 2014

(54) IMPLEMENTATION METHOD AND SYSTEM OF VIRTUAL PRIVATE NETWORK

(75) Inventors: Xiangbiao Yan, Shenzhen (CN); Yizhou Sun, Shenzhen (CN)

(73) Assignee: ZTE Corporation (CN)

( * ) Notice: Subject to any disclaimer, the term of this patent is extended or adjusted under 35 U.S.C. 154(b) by 0 days.

This patent is subject to a terminal disclaimer.

(21) Appl. No.: 13/496,284

(22) PCT Filed: Sep. 10, 2010

(86) PCT No.: PCT/CN2010/076788
§ 371 (c)(1),
(2), (4) Date: Mar. 15, 2012

(87) PCT Pub. No.: WO2011/032473
PCT Pub. Date: Mar. 24, 2011

(65) Prior Publication Data
US 2012/0180122 A1    Jul. 12, 2012

(30) Foreign Application Priority Data

Sep. 18, 2009  (CN) .......................... 2009 1 0176529

(51) Int. Cl.
*H04L 29/06*     (2006.01)
(52) U.S. Cl.
USPC ................. 726/15; 726/1; 713/152; 713/156; 713/161
(58) Field of Classification Search
USPC ................... 726/1, 14, 15; 713/152, 156, 161
See application file for complete search history.

(56) References Cited

U.S. PATENT DOCUMENTS

| | | | | |
|---|---|---|---|---|
| 8,416,769 | B2* | 4/2013 | Lewis | 370/352 |
| 2011/0002301 | A1* | 1/2011 | Chan et al. | 370/331 |
| 2011/0261800 | A1* | 10/2011 | You et al. | 370/338 |
| 2012/0014386 | A1* | 1/2012 | Xiong et al. | 370/392 |

FOREIGN PATENT DOCUMENTS

| | | |
|---|---|---|
| CN | 1485759 A | 3/2004 |
| CN | 1501720 A | 6/2004 |
| CN | 1801764 A | 7/2006 |
| CN | 101222414 A | 7/2008 |
| CN | 101753424 A | 6/2010 |
| JP | 2000183968 A | 6/2000 |
| JP | 2003008631 A | 1/2003 |

OTHER PUBLICATIONS

Luigi Iannone and Olivier Bonaventure, On the Cost of Caching Locator/ID Mappings, Dec. 2007, ACM.*

(Continued)

*Primary Examiner* — David Garcia Cervetti
(74) *Attorney, Agent, or Firm* — Brooks Kushman P.C.

(57) ABSTRACT

An implementation method and system of a virtual private network (VPN) are provided in the invention, wherein, the VPN dedicated mapping table of the VPN is stored in the mapping plane in the identity and location separation network, and it is determined whether to achieve the communication between the VPN end host users in the VPN or not according to the VPN dedicated mapping table, thereby the VPN is efficiently achieved in the identity and location separation network, meeting the user requirements for the VPN, eliminating the influence of the identity and location separation technical solution on the traditional VPN service, and reducing the changes on the existing devices and software tools due to the implementation of VPN.

10 Claims, 2 Drawing Sheets

(56) References Cited

OTHER PUBLICATIONS

Liu et al., A DHTs-Based Mapping System for Identifier and Locator Separation Network, Jun. 2009, IEEE.*
Mathy et al., LISP-DHT: Towards a DHT to map identifiers onto locators, Dec. 2008, ACM.*
Cheekiralla et al., An IPv6-Based Identification Scheme, 2006, IEEE.*
PCT Search Report Dated Sep. Dec. 16, 2010, Application No. PCT/CN2010/076788, Applicant ZTE Corporation et al.
D. Farinacci et al., Locator/ID Separation Protocol (LISP) Draft-Farinacci-LISP-12.TXT, Reference, Dated Mar. 2, 2009—(PA12-119).
Japanese Office Action, PA12-119, 405560, 2012-529109, 3 Pages.

* cited by examiner

IMPLEMENTATION METHOD AND SYSTEM OF VIRTUAL PRIVATE NETWORK

CROSS-REFERENCE TO RELATED APPLICATIONS

This application is a U.S. national phase of PCT Application No. PCT/CN2010/076788 filed Sep. 10, 2010 which claims priority to Chinese Application No. 200910176529.8 filed Sep. 18, 2009, the disclosures of which are incorporated in their entirety by reference herein.

TECHNICAL FIELD

The present invention relates to the identity and location separation technology, and in particular, to an implementation method and system of virtual private network in the identity and location separation network.

BACKGROUND OF THE RELATED ART

The research related to the next generation information network architecture is one of the most popular topics. The basic direction of these research topics takes seamlessly integrating services in the telecommunication network represented by the voice service, the TV network represented by the video service, and the Internet network represented by the data service as the purpose and takes the IP-based network bearer as a feature, typical examples are the VOIP (Voice over Internet Protocol, IP phone) providing the voice service, the IPTV network providing the TV service, the 3G mobile communication network which uses the IP core network to bear, and a lot of super-3G or 4G network research projects, and so on.

4G is short for the $4^{th}$ generation mobile communication system, and the 4G aims to provide the voice, data and streaming media services with an IP bearer network based solution so that the users can obtain a higher-speed communication environment at "any time, any place, any service".

The NGN (Next Generation Network) is the next generation network established on the basis of the telecommunication network and intended to establish a unified IP packet switch based transmission layer. The development of each application program may be independent of specific transmission technology on the unified transmission layer, thereby expanding the application range of the application programs.

As the current IP-based packet bearer network is evolved from the IPv4. The IP technology is originated in the United States, therefore, the United States and other developed countries own a large number of IPv4 addresses, in contrary, very few IP addresses are allocated to the populous developing countries, resulting in that the development of the IP packet bearer network and a variety of communication networks are constrained by the lack of IP addresses in the developing countries, for example, the number of China's Internet users has exceeded the number of its own IPv4 addresses at present, and the number of network users in China is still increasing with high speed, and other technologies and equipments have to be used to increase the reuse of IP addresses, so the problem of the lack of IP address space is a serious problem haunting the future development of China's IP bearer network and communications networks. The best way to solve this problem is to use the IPV6, but such an outright change in network architecture technology will lead to that enormous construction costs are needed to build the IPv6 bearer network and hundreds of millions of ends are needed to be replaced, which is expensive, showing that this is not a suitable scheme so far.

From the above technical review, it can be seen that the research emphasis and direction selection of the next generation network architecture are very different due to differences in the technical basis, the interest background and so on, but the faced problems and difficulties are the same.

The 3G and 4G are research core of the next generation network in the field of wireless communications and are intended to improve the quality of wireless mobile communications based on the full IP packet core network; the NGN and the NGI (Next-Generation Internet) are researches of the next-generation network convergence respectively in the fields of telecommunications network and the Internet respectively; the CNGI (China's Next Generation Internet) is intended to build the next generation Internet based on IPv6; the "Fundamental Research on the integrated trusted network and pervasive service system" of Beijing Jiaotong University expects to build a unified new packet network. Although the various studies are greatly different, the viewpoint generally accepted by the various studies is that: the future network is a packet based unified bearer network. Therefore, the studying of the next generation network architecture takes the Internet as the main reference object. Since its birth, the Internet keeps a rapid development and has become the most successful and most viable communication network, the flexible scalability, efficient packet switching, powerful ends and other characteristics are very consistent with the design needs of the new generation network, and the Internet will be the main reference blueprint of the new generation network design. However, the structure of the Internet is far from optimal, and there are many important design problems. Besides that the IP address space cannot meet the application requirement, the problems mainly represent in the following aspects:

the Internet was invented in the 1970s when it was hard to predict that there would exist a large number of mobile ends and multiple-home ends in today's world, and thus the Internet protocol stack at that time is mainly designed for the ends which are "fixedly" connected. In the network environment at that time, because the end basically did not move from one location to another, the sending address is the receiving address, and the path is reversible, for which the IP address having dual attributes of identity and location can work well and there is not any conflict between the identity attribute and the location attribute of the IP address. The IP address representing both the identity and the location just met the network requirements at that time. From the network environment at that time, this design is simple and effective, and it simplifies the hierarchy of the protocol stack. But there is no doubt that the location attribute and identity attribute of the IP address have internal contradictions. The identity attribute of the IP address requires that any two IP addresses are equal, although the IP addresses can be allocated in accordance with the organizations, but the continuously encoded IP addresses have no inevitable relationship, or at least have no inevitable relationship in topology locations; the location attribute of the IP address requires that the IP addresses are allocated based on the network topology (rather than the organization), and the IP addresses in the same subnet should be in a continuous IP address block, so that the IP address prefixes in the network topology can be aggregated, thereby reducing the routing table entries in the router equipment and ensuring the scalability of the routing system.

With the development of the network size and the technology, some technologies for allocating dynamically IP addresses, such as the Dynamic End host Configuration Protocol (DHCP) gradually emerge, which began to break the assumption that an IP address uniquely represents an end. The use of private IP address space and the birth of the Network Address Translator (NAT) technology make the situation even worse. In this case, the IP address having both the identity attribute and the location attribute is difficult to play its role, and the dual attribute problem of the IP address has been prominent. Besides that the requirements at the technical level change significantly, the Internet users have also undergone tremendous change. In the first few years after the birth of the Internet, the Internet is basically shared by some mutually trusted personnel in the same group, and the traditional Internet protocol stack was designed based on this assumption; the current Internet users are quite a mixed bag, it is difficult to trust each other. In this case, the Internet without the built-in security mechanism also requires changing.

In general, the internal contradictions of the dual attribute of the IP address will lead to the following main problems.

1. The Problem of Routing Scalability

The scalability of the Internet routing system has a basic assumption: "either the addresses are allocated according to the topology, or the topology is deployed according to the addresses". The identity attribute of the IP address requires that the IP addresses are allocated based on the organization (not the network topology) to which the end belongs, and this allocation needs to maintain a certain stability and cannot change frequently; the location attribute of the IP address requires that the IP addresses are allocated based on the network topology, so as to ensure the scalability of the routing system. Thus, a conflict comes between the two attributes of the IP address, which finally leads to the scalability problem of the Internet routing system.

2. The Problem of Mobility

The identity attribute of the IP address requires that the IP address should not change with the end location, so as to guarantee that the communication bound to the identity is not interrupted, and also guarantee that after the end moves, other ends can still use its identity to establish the communication connection with the end; while the location attribute of the IP address requires that the IP address changes with the end location, so that the IP addresses can aggregate in a new network topology, otherwise, the network must reserve a separate routing information for the moved end, resulting in the rapid increase of the routing table entries.

3. The Problem of Multiple Homes

Multiple homes usually mean that the ends or networks simultaneously access to the Internet via the networks of a plurality of ISPs (Internet Service Providers). The advantages of the multi-home technology comprise increasing the network reliability, supporting the traffic load balancing between multiple ISPs and improving the overall available bandwidth and so on. However, the internal contradiction of the dual attributes of the IP address makes the multi-home technique difficult to achieve. The identity attribute of the IP address requires that a multi-home end shows always the unchanged identity to other ends, no matter via how many ISPs the end accesses to the Internet; while the location attribute of the IP address requires that a multi-home end uses different IP addresses to communicate in different ISP networks, so as to ensure that the end's IP address is able to aggregate in the ISP network topology.

4. The Problem of Security and Location Privacy

Since the IP address contains both the identity information and location information of the end, the communication peer end and malicious eavesdroppers can obtain simultaneously the identity information and the topology location information of the end based on the IP address of the end.

Overall, since the system structure is established for the traditional Internet, the technology environment and user groups of the Internet have undergone enormous changes, and the Internet needs to be innovated. The problem of dual attributes of the IP address is one of the basic reasons troubling the Internet to continue to develop, and separating the identity attribute and the location attribute of the IP address is a good idea to solve the problems faced by the Internet. The new network will be designed based on this idea, and a network architecture where the identity information is separated with the location information is proposed to solve some serious drawbacks of the existing Internet.

In order to solve the problem of identity and location, the industry makes a lot of researches and explorations, and the basic idea of all the identity and location separation schemes is to separate the dual attributes, identity and location, that are originally bound to the IP address. Among the schemes, some schemes, such as the IPNL (IP Next Layer, belonging to the NAT scalable architecture mode), TRIAD (A Scalable Deployable NAT-based Internet Architecture), and so on, use the URL (Uniform Resource Locator, which is an identification method used to completely describe the addresses of Web pages and other resources in the Internet) in the application layer or the FQDN (Fully Qualified Domain Name) as the identity identifier of the end; some schemes introduce a new name space as the identity identifier, for example, the HIP (End host Identity Protocol) adds a end host identifier to the network layer which takes the IP address as the location identifier; some schemes, such as LISP (Locator/ID Separation Protocol) and so on, classify the IP addresses, wherein, some IP addresses work as the identity identifiers, and some other IP addresses work as the location identifiers; the Chinese patent application CN1801764, published on Jul. 12, 2006, by Zhang Hongke, et al, from Beijing Jiaotong University, named "an internet access method based on the identity and location separation", uses the IP address as the location identifier of the end host, and introduces the end host identity as the identity identifier to solve the problem of the identity and location separation. In the aforementioned schemes, the end host-based solutions need to modify the end host protocol stack, such as the HIP; the network-based solutions need to improve the routers at the specific locations. Moreover, for the solutions both based on the network, the locations of the routers fulfilling the identity and location mapping function are different. Some schemes definitely specify that the routers fulfilling the mapping function should be located at the boundaries of the user network, that is, the mapping function routers belong to the user network; some schemes (LISP, TIDR (Tunneled Inter-domain Routing) and Ivip (Internet Vastly Improved. Plumbing)) does not constraint the location of the mapping function router in the network; some schemes are definitely to address the routing scalability problem and to ensure that only the network administrator can obtain the identity and location mapping information, and constrain strictly that the mapping function router is the core network access router, that is, the mapping function router belongs to the core network. In solutions where both the identity identifier and the location identifier are in the network layer meanwhile, such as LISP, there is a design difference on whether to completely separate the identity and location strictly according to the division of the network topology or not. The current version of the LISP protocol requires that the network must use the EID (End Identifier) to route the first packet to the peer end before providing the mapping analysis service, so that the tunnel routers of both communication sides learn the mapping relationship between the RLOC (routing Locator) and EID, which makes at least part of the routing nodes in the network save simultaneously both the RLOC-based and the EID-based routing entries, thus affecting the capability of the LISP to solve the routing scalability problem.

The original intentions the various identity and location separation schemes are different, so the function ultimately achieved also varies. IPNL is designed to make the IPv4 network get a longer life to avoid the problem of full replacement caused by replacing the IPv4 protocol with the IPv6 protocol. The TRIAD is designed to solve various problem s caused by the NAT to the Internet, and meanwhile provide some support to the mobility, the policy routing and so on. HIP was originally proposed to solve the security problem, and afterwards did a lot of work on supporting the mobility and makes study on multi-home support. SHIM6 (Level 3 Shim for IPv6) is proposed mainly to solve the problem of the IPv6 network supporting multiple homes. The LIN6 (Location Independent Networking for IPv6) is designed to provide the IPv6 protocol with a mobility option and multi-home solution. The ILNP (Identifier Locator Network Protocol) is designed to provide an IPv6 extension mechanism to solve the mobility and multi-home problem. The GSE (Global, Site and End-System Designator) attempts to change the IPV6 address structure, so as to control the increase of the global routing table entries and support more flexibly the multi-home technology. The TIDR is designed to enhance the routing and forwarding function of the existing Internet to solve the global routing table expansion, inter-domain routing safety and multi-home problem s. The LISP is mainly designed to solve the routing scalability problem.

All the above proposals and schemes give solutions based on part of the problem to achieve the identity and location separation in the existing network architecture. The identity and location separation is the key technology of the future data communication network, especially the mobile data communications network.

The VPN (virtual private network) can achieve interconnections between different network components and resources. The VPN can use the infrastructures of the Internet or other public Interconnection networks to create a tunnel for the user, and provide the same security and functionality guarantees as the private network.

The VPN has many implementation solutions, and these implementation solutions are specifically divided into the customer premises equipment VPN solution (CPE-VPN) and the Provider Provisioned VPN solution (PP-VPN).

The CPE-VPN solution is characterized by that the user sets, manages and maintains the VPN gateway device, and standard VPN tunneling based connections are established between various branches and corporate headquarter through the public IP network, wherein, the tunneling protocol usually uses the Layer 2 tunneling protocol (L2TP), Point to Point Tunneling Protocol (PPTP), IPsec (secure IP), IP in IP (IP encapsulated in IP) and GRE (Generic Routing Encapsulation), and so on, and various encryption technologies and NAT technologies are used to guarantee the security of data transmission.

The establishment and management of the VPN tunneling connection are full charged by the users themselves, and the providers do not need to adjust or change the network structure and performance. This approach is commonly referred to as "self-built VPN" mode.

The VPN supported enterprise uses public networks such as the Internet to establish connections with its branches or other companies and make secure communications. This VPN connection established across Internet is logically equivalent to the connection established between two places by using the wide area network. Although the VPN communication is established on the basis of the public interconnected network, the users feel that they use the private network to communicate when using the VPN, so the network is named the virtual private network. The VPN technology can solve the problem that employees need access to central resources, and companies must timely and effectively communicate with each other in the case that remote communication amount increases day after day and enterprise global operations are widely distributed.

The basic usage of the VPN is:

achieving remote user access via the VPN, the VPN supporting to access the enterprise resources remotely in a secure way through the public interconnection network, for example, the VPN users firstly dial the broadband remote access server (BRAS) of the local Internet service provider (ISP), then use the VPN software to establish a VPN across the Internet or other public interconnection networks between the remote user and the enterprise VPN server with the connection established with the local ISP.

When a VPN is used to connect a remote local area network, there is no need to use expensive long-distance dedicated circuit, and the routers in the branches and enterprise end can connect the Internet via the local ISP by using their own local private lines, or dial-up to access into the broadband access server of the ISP so as to connect the Internet. The VPN software is used to establish a VPN between the routers of each branch and the router of the enterprise end with the established connection to the local ISP and the Internet.

The operator implemented PP-VPN solution means to set a VPN gateway device in the public data communication network of the operator for the dedicated access users or remote dial-up access users. With the gateway device, the VPN may be established via technologies such as the tunneling encapsulation, virtual routers or MPLS (Multiprotocol Label Switching) based on the specific VPN network needs in the whole network, and the encryption technology can be used to protect the data transmission security. The establishment of the VPN connection is entirely charged by the operator, and is transparent to the user. This method is commonly referred to as "outsourcing VPN" mode.

At the same time as the rapid development of the broadband access network, in order to expand their business with high quality, the operators must solve the following problem: how to perform a rational hierarchical planning on the network structure to achieve the user positioning and service management. Since the Ethernet technology is widely used in the access network level, currently, the technology achieving the network dividing based on the Ethernet is mainly the virtual local area network (VLAN) technology. The VLAN is an emerging technology that achieves a virtual working group by logically rather than physically dividing the devices in the LAN into multiple network segments. The IEEE (The Institute of Electrical and Electronics Engineers) issued the 802.1Q protocol standard draft to standardize the VLAN implementation scheme in 1999. The traditional Ethernet frame format defines 4096 VLANs which are proposed to solve the broadcast problem and the safety of Ethernet. The VLAN adds the VLAN header on the basis of the Ethernet frame, uses the VLAN ID to divide the users into smaller working groups, and restricts the users in different working groups exchange visits in the second layer. Each working group is a virtual LAN, of which the benefit is that it can restrict the broadcast range, form a virtual working group and dynamically manage the network. The VLAN isolates the broadcast storm and also isolates the communications between different VLANs, so the routers are needed to complete the communications between different VLANs.

There are several main methods for dividing the VLAN. One is to divide the VLAN according to the port, and this method is the most common method; the second method is to divide the VLAN based on the MAC (Media Access Control) address, the biggest advantage of which is that the VLAN does not need to be reconfigured when the user physical location moves, that is, the location changes from one switch to another switch, and the disadvantage is that all the users must be configured during the initialization, leading to a lower execution efficiency of the switch; the third method is to divide the VLAN based on the network layer, which divides the VLAN according to the network layer address or the protocol type (if supporting multiple protocols) of each end host rather than according to the routing, so even if the user's physical location changes, it does not need to reconfigure the VLAN to which the user belongs, the disadvantage is that re-analyzing the frame header will reduce efficiency; the fourth method is to divide the VLAN based on the IP multicast, wherein, the IP Multicast is actually also a definition of the VLAN, that is, a multicast group is considered to be one VLAN, this VLAN division method expands the VLAN to the wide area network, so this method has greater flexibility, moreover, the method can easily be extended through the router.

As the VPN technology in specific Ethernet communication environments, the VLAN has been applied in a large scale on broadband access. The VPN that is applied frequently in the core network or the wide area network is the VPN based on the multi-protocol label switching (MPLS).

The emergence of the Multi-Protocol Label Switching (MPLS) technology changes the whole Internet system structure. The technical scheme of using the MPLS technology to implement the VPN significantly reduces the deficiencies of the traditional IP network, and further provides the same security guarantee as the Frame Relay or ATM (Asynchronous Transfer Mode) network, thus it can be well adapted to the VPN service needs.

The network model of MPLS VPN comprises: a customer edge (CE) device, which may be a router or Layer 2 switch that is located at the client side and provides access to the network provider; the provider edge (PE) router, which mainly maintains the node related forwarding table, exchanges the VPN routing information with other PE routers, and uses the Label Switched Path (LSP) in the MPLS network to forward the VPN service, and this is the Label Edge Router (LER) in the MPLS network; the provider router (PR), which uses the established LSP to transparently forward the VPN data, and does not maintain the VPN-related routing information, and this is the Label Switching Router (LSR) in the MPLS network.

The advantages of the MPLS VPN:

security: since the MPLS VPN uses the routing isolation, address isolation, information hiding and other various means, it provides anti attack and anti label spoofing methods, thus the MPLS VPN is completely able to provide security guarantees similar to the ATM/FR VPN.

Scalability: the MPLS VPN is highly scalable. On the one hand, the MPLS network can accommodate a large number of VPNs, on the other hand, for the number of user nodes, since the BGP (Border Gateway Protocol) is used to allocate and manage the members, the number of user nodes in the same VPN is not restricted, and it is easy to be expanded, and any node can directly communicate with any other nodes. Especially, it does not need to one-by-one configure the circuits between the user nodes when implementing the full-grid communication between the user nodes, and the user side only needs one port/one line to access the network, thus avoiding the N square scalability problem.

Reliability: the MPLS VPN services naturally have a large bandwidth, multiple nodes, multiple routes, sufficient network and transmission resources to ensure the network reliability. When the trunk line within the Internet is interrupted, the MPLS VPN traffic detours to the other circuits based on the IGP (Interior Gateway Protocol) together with the general Internet traffic, the process is automatically fulfilled relying completely on the IGP convergence, and is completely transparent to the users, and no single point failure exists during the transmission in the wide area network.

SUMMARY OF THE INVENTION

In the identity and location separation technical scheme, the aforementioned VPN technology implementation is affected and the PP-VPN solution is affected, and especially, the influence on the three-layer IP address related scheme is relatively large. The identity and location separation mainly relates to the VPN user's identity identifier and communication protocols, the VPN access management needs to use the identity identifier of the end host to authenticate and manage, and needs to upgrade the management system. For the CPE-VPN solution, the end host does not use the IP address to communicate after the location and the identity are separated, and the identity identifier (EID) of the end host is needed to communicate, so the CPE-VPN solution is largely affected, and the VPN software needs to be upgraded to support the identity identifier of the end host.

The technical problem to be solved in the present invention is to provide an implementation method and system of virtual private network to easily implement the virtual private network in the identity and location separation network.

To solve the above technical problem, the present invention provides an implementation method of virtual private network, wherein, the VPN is implemented based on an identity and location separation network, and the method comprises:

A, setting a VPN dedicated mapping table and a general mapping table of the VPN in a mapping plane of the identity and location separation network, wherein, the VPN dedicated mapping table comprises an identity identifier-location identifier mapping relationship of VPN end hosts in the same VPN, the general mapping table comprises the host identity identifier-location identifier mapping relationship of a general end;

B, the mapping plane inquiring the VPN dedicated mapping table or the general mapping table consistent with an attribute of a source end host according to the identity identifier of a destination end host, if the mapping relationship of the destination end host is found, the identity and location separation network implementing communication between the source end host and the destination end host, or else, the communication failing.

Preferably, the attribute means whether the end host is a VPN end host or not, in step B, if the attribute of the source end host indicates that the source end host is a VPN end host, the mapping plane inquires the VPN dedicated mapping table; or else, inquires the general mapping table.

Preferably, the mapping plane comprises a plurality of VPN dedicated mapping tables, different VPN dedicated mapping tables correspond to different VPNs and have different VPN identifiers; the attribute indicates whether the end host is a VPN end host or not, and indicates the VPN identifier of the end host when the end host is a VPN end host; in step B, if the attribute of the source end host indicates that the source end host is a VPN end host, the mapping plane inquires the VPN dedicated mapping table corresponding to the VPN identifier; or else, the mapping plane inquires the general mapping table.

Preferably, the step B comprises:

B1, an access service node (ASN) receiving a message carrying the identity identifier of the source end host and the identity identifier of the destination end host sent by the source end host;

B2, the ASN inquiring an attribute table according to the identity identifier of the source end host to obtain the attribute of the source end host, and forwarding the message or sending an inquiry request to the mapping plane, wherein, the message or the request carries the attribute of the source end host and the identity identifier of the destination end host;

B3, the mapping plane inquiring the VPN dedicated mapping table or the general mapping table consistent with the attribute of the source end host according to the identity identifier of the destination end host;

B4, if the inquiry result comprises the location identifier of the destination end host, the ASN or the mapping plane forwarding the message to the destination access service node corresponding to the destination location identifier so as to achieve communication, otherwise, the communication fails.

Preferably, after the step B4, when the destination access service node receives the message and forwards to the destination end host, meanwhile, the destination access service node records the identity identifier-location identifier mapping relationship of the source end host as well as the VPN attribute of the source end host in a local mapping table; after the destination access service node receives the message sent back from the destination end host, the destination access service node inquires the local mapping table, and directly forwards the message when the attribute of the source end host is determined to be the same as the destination end host.

To solve the above technical problem, the present invention also provides another implementation method of virtual private network, wherein, the VPN is achieved based on an identity and location separation network, the method comprises:

A, setting a VPN dedicated mapping table in a mapping plane of the identity and location separation network, wherein, the VPN dedicated mapping table comprises an identity identifier-location identifier mapping relationship of VPN end hosts in the same VPN;

B, the mapping plane inquiring the VPN dedicated mapping table, if the mapping relationship of a destination end host is found, the identity and location separation network implementing communication between a source end host and the destination end host, or else, the communication failing.

Preferably, a plurality of VPN dedicated mapping tables are set simultaneously in the mapping plane, wherein, different VPN dedicated mapping tables correspond to different VPNs and have different VPN identifiers;

in step B, the mapping plane inquires the VPN dedicated mapping table consistent with the source end host VPN identifier according to the identity identifier of the destination end host, if the mapping relationship of the destination end host is found, the identity and location separation network achieves communication between the source end host and the destination end host, otherwise, the communication fails.

The step B comprises:

B1, an access service node (ASN) receiving a message carrying the identity identifier of the source end host and the identity identifier of the destination end host sent by the source end host;

B2, the ASN inquiring an attribute table according to the identity identifier of the source end host to obtain the attribute of the source end host, and forwarding the message or sending an inquiry request to the mapping plane, wherein, the message or the request carries the attribute of the source end host and the identity identifier of the destination end host;

B3, the mapping plane inquiring the VPN dedicated mapping table consistent with the attribute of the source end host according to the identity identifier of the destination end host;

B4, if the inquiry result comprises the location identifier of the destination end host, the ASN or the mapping plane forwarding the message to the destination access service node corresponding to the destination location identifier so as to achieve communication, otherwise, the communication fails.

Preferably, after the step B4, when the destination access service node receives the message and forwards to the destination end host, meanwhile, the destination access service node records the identity identifier-location identifier mapping relationship of the source end host as well as the VPN attribute of the source end host in a local mapping table; after the destination access service node receives the message sent back from the destination end host, the destination access service node inquires the local mapping table, and directly forwards the message when the attribute of the source end host is determined to be the same as the destination end host.

To solve the above technical problem, the present invention also provides an implementation system of virtual private network, wherein, the system is achieved based on an identity and location separation architecture network, and the system comprises an access service node (ASN) and a mapping plane which are connected through network, and the ASN comprises a first transmit-receive module, an attribute table and an attribute table inquiring module, wherein:

the first transmit-receive module is set to: receive a message carrying the identity identifier of the source end host and the identity identifier of the destination end host sent by a source end host, and notify the attribute table inquiring module; and forward the message or send an inquiry request to the mapping plane, wherein, the message or the inquiry request carries the attribute of the source end host and the identity identifier of the destination end host; when sending the inquiry request to the mapping plane, the first transmit-receive module is further set to receive an inquiry result sent by the mapping plane, if the mapping relationship of the destination end host is found, forward the message according to the inquiry result, otherwise, the communication fails;

the attribute table is set to: store the corresponding relationship between the end host and attribute thereof;

the attribute inquiring module, connected with the first transmit-receive module and the attribute table, is set to inquire the attribute table according to the identity identifier of the source end host to obtain the attribute of the source end host, and notify the first transmit-receive module;

the mapping plane comprises a second transmit-receive module, a mapping database and a database inquiring module, wherein:

the second transmit-receive module is set to: receive the forwarded message or the sent inquiry request by the ASN, and notify the database inquiring module; when receiving the inquiry request, send an inquiry result to the ASN; when receiving the forwarded message, if the mapping relationship of the destination end host is found, forward the message according to the inquiry result, otherwise, the communication fails;

the mapping database is set to: store a VPN dedicated mapping table and a general mapping table, wherein, the VPN dedicated mapping table comprises an identity identifier-location identifier mapping relationship of VPN end hosts in the same VPN, the general mapping table comprises the host identity identifier-location identifier mapping relationship of a general end;

the database inquiring module, connected with the second transmit-receive module, is set to inquire the VPN dedicated mapping table or the general mapping table consistent with the attribute of the source end host according to the identity identifier of the destination end host, and notify the second transmit-receive module of the inquiry result.

Preferably, the attribute indicates whether the end host is a VPN end host or not; if the attribute of the source end host indicates that the source end host is a VPN end host, the database inquiring module of the mapping plane inquires the VPN dedicated mapping table; or else, inquire the general mapping table.

Preferably, the mapping database of the mapping plane comprises a plurality of VPN dedicated mapping tables, different VPN dedicated mapping tables correspond to different VPNs and have different VPN identifiers; the attribute indicates whether the end host is a VPN end host or not, and indicates the VPN identifier of the end host when the end host is a VPN end host; if the attribute of the source end host indicates that the source end host is a VPN end host, the database inquiring module of the mapping plane inquires the VPN dedicated mapping table corresponding to the VPN identifier; or else, inquire the general mapping table.

To solve the above technical problem, the present invention also provides another implementation method of virtual private network, and the virtual private network is implemented based on the identity and location separation network, and the method comprises:

A, a mapping plane in the identity and location separation network setting a virtual private network (VPN) dedicated mapping table, and the VPN dedicated mapping table comprises the identity identifier-location identifier mapping relationship of the VPN end hosts in the same VPN network;

B, when the source end host is a VPN end host, the identity and location separation network achieves the communication between the VPN end hosts in the VPN according to the VPN dedicated mapping table.

Preferably, the mapping plane comprises a plurality of VPN dedicated mapping tables, and different VPN dedicated mapping tables correspond to different VPN networks and have different VPN identifiers; in step B, the identity and location separation network achieves the communication between the VPN end hosts in the corresponding VPN according to the VPN dedicated mapping table consistent with the VPN identifier of the source end host.

In the present invention, the VPN dedicated mapping table of the VPN is stored in the mapping plane in the identity and location separation network, and it is determined whether to achieve the communication between the VPN end host users in the VPN or not according to the VPN dedicated mapping table, thereby the VPN is efficiently achieved in the identity and location separation network, meeting the user requirements for the VPN, and eliminating the influence of the identity and location separation technical solution on the traditional VPN service.

PREFERRED EMBODIMENTS OF THE PRESENT INVENTION

Identity and location separation data communication network has the following features. It is bound to separate the identity attribute and the location attribute of the traditional IP address where the IP address has only the location attribute and works as the geographical location identifier of the end host, and an identity identifier of the end host is newly added to be the end identity identifier in communication transmission, The location identifier of the end host is decided by the geographical location of the end host and the network topology. In the moving process of the end host, the location change leads to the change of the location identifier of the end host, but the identity identifier of the end host is the identifier uniquely used by the end identity, and the identity identifier does not change in the moving process of the end host. Meanwhile, the end host identity identifier-location identifier mapping must be added, and a functional entity is needed to complete this mapping relationship, such a functional entity is called as the mapping plane in the present invention.

In a variety of identity and location separation schemes, the name of this mapping plane is different, for example, in the patent ZL200610001825.0 by Zhang, Hongke from Beijing Jiaotong University, the mapping plane is interpreted as follows: introducing an identity analyzer responsible for analyzing the mapping relationship between the end host identifier (EID) and the IP address and dynamically maintaining and updating the binding between the EID and the IP address. In the LISP technical scheme, LISP3 scene uses the mapping database to provide the EID-RLOC mapping relationship, and the mapping database implemented with the LISPDHT (LISP Distributed Hash Tables) is now being studied. In some other schemes, the name of the mapping server is also known. While in the present invention, the mapping plane is the uniform name.

The main idea of the implementation method and system of the virtual private network in accordance with the present invention is that the VPN dedicated mapping table of the virtual private network (VPN) is stored in the mapping plane of the identity and location separation network, when the source end host is a VPN end host, the identity and location separation network achieves the communications between the VPN end hosts within the VPN according to the VPN dedicated mapping table, so that the VPN is achieved very effectively in the identity and location separation network, thus meeting the user requirements for the virtual private network, and eliminating the influence of the identity and location separation technical solution on the traditional VPN services.

Figure 1:
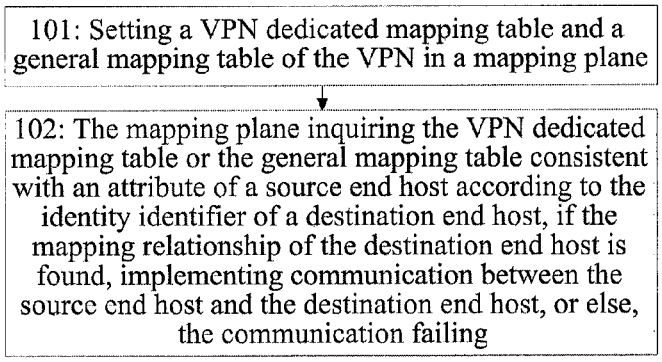
FIG. 1 is a schematic diagram of an implementation method of virtual private network in accordance with an example of the present invention.

As shown in FIG. 1, the implementation method of the virtual private network in accordance with an example of the present invention is achieved based on the identity and location separation network, and the method comprises:

step 101, setting a VPN dedicated mapping table and a general mapping table of the VPN in a mapping plane of the identity and location separation network, wherein, the VPN dedicated mapping table comprises an identity identifier-location identifier mapping relationship of VPN end hosts in the same VPN, the general mapping table comprises the host identity identifier-location identifier mapping relationship of a general end;

step 102, the mapping plane inquiring the VPN dedicated mapping table or the general mapping table consistent with an attribute of a source end host according to the identity identifier of a destination end host, if the mapping relationship of the destination end host is found, the identity and location separation network implementing communication between the source end host and the destination end host, or else, the communication failing.

The aforementioned example achieves simultaneously a VPN network communication and the general communication in the same identity and location separation network.

For the case that the mapping plane only has one VPN dedicated mapping table, the attribute means whether the end host is a VPN end host or not, in step 102, if the attribute of the source end host indicates that the source end host is a VPN end host, the mapping plane inquires the VPN dedicated mapping table; or else, the mapping plane inquires the general mapping table.

In order to achieve a plurality of VPNs in the same identity and location separation network, a plurality of VPN dedicated mapping tables are set in the mapping plane, and different VPN dedicated mapping tables correspond to different VPNs and have different VPN identifiers; the attribute indicates whether the end host is a VPN end host or not, and indicates the VPN identifier of the end host when the end host is a VPN end host; in step 102, if the attribute of the source end host indicates that the source end host is a VPN end host, the mapping plane inquires the VPN dedicated mapping table corresponding to the VPN identifier; or else, the mapping plane inquires the general mapping table.

Of course, the present invention is also applicable to the case that a plurality of VPN dedicated mapping tables are set in the mapping plane, but no general mapping table is set, so as to achieve a plurality of different VPNs in the identity and location separation network, in which case, the implementation method of virtual private network in accordance with another example of the present invention can be summarized as follows.

A, a plurality of VPN dedicated mapping tables are set in the mapping plane in the identity and location separation network, and each VPN dedicated mapping table comprises the identity identifier-location identifier mapping relationship of the VPN end host of the same VPN; different VPN dedicated mapping tables correspond to different VPNs and have different VPN identifiers;

B, the mapping plane inquiring the VPN dedicated mapping table consistent with the source end host VPN identifier according to the identity identifier of the destination end host, if the mapping relationship of the destination end host is found, the identity and location separation network implements the communication between the source end host and the destination end host, otherwise, the communication fails.

The identity and location separation network comprises the access service node and the mapping plane, in the specific implementation of step 102 and step B, the mapping plane can be used to achieve the message forwarding or another forwarding plane except the mapping plane can be used to implement the message forwarding, which specifically comprises:

a, the access service node (ASN) receiving a message carrying the identity identifier of the source end host and the identity identifier of the destination end host sent by the source end host;

b, the ASN inquiring an attribute table according to the identity identifier of the source end host to obtain the attribute of the source end host, and forwarding the message or sending an inquiry request to the mapping plane, wherein, the message or the request carries the attribute of the source end host and the identity identifier of the destination end host;

c, the mapping plane inquiring the VPN dedicated mapping table or the general mapping table consistent with the attribute of the source end host according to the identity identifier of the destination end host;

d, if the inquiry result comprises the location identifier of the destination end host, the ASN or the mapping plane forwarding the message to the destination access service node corresponding to the destination location identifier so as to achieve communication, otherwise, the communication fails.

In addition, as a variation of the aforementioned example, the following example may also be comprised:

an implementation method of virtual private network, wherein, the VPN is achieved based on an identity and location separation network, the method comprises:

A, setting a VPN dedicated mapping table in a mapping plane of the identity and location separation network, wherein, the VPN dedicated mapping table comprises an identity identifier-location identifier mapping relationship of VPN end hosts in the same VPN;

B, when the source end host is a VPN end host, the identity and location separation network achieves the communication between the VPN end hosts in the VPN according to the VPN dedicated mapping table.

Preferably, the mapping plane may comprises a plurality of VPN dedicated mapping tables, and different VPN dedicated mapping tables correspond to different VPN networks and have different VPN identifiers; in step B, the identity and location separation network achieves the communication between the VPN end hosts in the corresponding VPN according to the VPN dedicated mapping table consistent with the VPN identifier of the source end host.

The implementation method of the present invention is further described in detail below, taking the message forwarding implemented through the mapping plane for instance, with reference to the accompanying diagrams.

Figure 2:
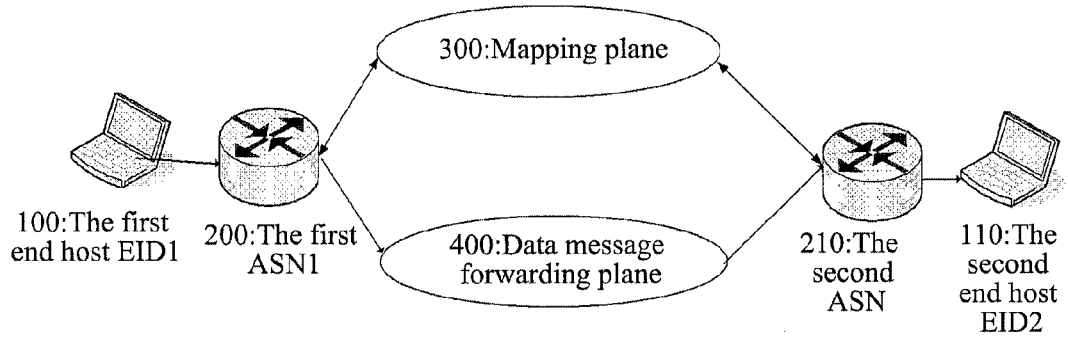
FIG. 2 is a schematic diagram of identity and location separation architecture used for implementing the virtual private network in accordance with an example of the present invention.

The schematic architecture of the identity and location separation network is as shown in FIG. 2, wherein, the user end host (that is, the endpoint, as the first end host 100 and the second end host 110 shown in FIG. 2) uses the end identifier (EID) to communicate, and each end host has a unique EID; the access service nodes (ASNs) in the network (as the first ASN 200 and the second ASN 210 shown in FIG. 2) is responsible for encapsulating, mapping, forwarding the messages sent or received by the endpoint, and inquiring the mapping plane 300 about the identity identifier-location identifier mapping of the end host; the data message forwarding plane (the forwarding plane for short) 400 is responsible for forwarding the message mapping processed by the ASN; the mapping plane 300 maintains the identity identifier-location identifier mapping relationship of the end host and maintains the timely update of the mapping relationship, and provides mapping inquiry to the ASN, and inquires the location identifier according to the identity identifier.

The mapping plane 300 stores the identity identifier EID-location identifier (LID) mapping relationships of all the endpoints in the network, as shown in the following table:

| | |
|---|---|
| Identity identifier EID (1) | LID (1) |
| Identity identifier EID (2) | LID (2) |
| ... | ... |
| Identity identifier EID (n − 1) | LID (n − 1) |
| Identity identifier EID (n) | LID (n) |

The processing of the Access Service Node (ASN) on the message is as follows.

When the first ASN 200 receives the message containing the identity identifier EID (1) sent by the first end host 100 to the second end host 110, the first ASN 200 inquires the local mapping relationship table according to the destination EID (2); if the local mapping relationship table is found, the first ASN 200 encapsulates the message directly according to the inquired destination LID (2) and its own LID (1), and then forwards the encapsulated message to the forwarding plane; otherwise, inquire the LID (2) in the mapping plane.

The communication peer end, the second ASN210, receives the message encapsulated with its own LID (2) Address, decapsulates the message, forwards the decapsulated EID (2) message to the second end host 110 in the downlink, and meanwhile learns the message source LID (1)-EID (1) mapping relationship; the second ASN210 receives the message sent by the second end host 110 to the first end host 100. Since the EID (1)-LID (1) mapping relationship has been learned by the second ASN210 of the peer end in the above process, the second ASN210 must be able to locally find the mapping relationship, and do not need to inquire the mapping plane 300, when the LID (1) is directly encapsulated in the second ASN210 to forward. When the message is returned to the ASN1 via the forwarding plane 400, the message is decapsulated and then sent to the first end host 100.

The method for implementing the VPN in the network architecture as shown in FIG. 2 is as follows.

First of all, a VPN dedicated mapping table is set in the mapping plane 300, and the table comprises the identity identifier-location identifier mapping relationships of all the user end hosts in the VPN. The mapping plane now has two kinds of mapping tables, wherein, one is the general mapping table, and the other is the VPN dedicated mapping table.

Secondly, the VPN attribute table of the VPN network user access is set in the ASN, which indicates that when processing messages of the end host, the ASN can only inquire the VPN dedicated mapping table of the VPN to which the user belongs so as to establish communications between the VPN users, and cannot establish communications with users not in the VPN dedicated mapping table, meanwhile, no users other than the ones in the VPN dedicated mapping table can inquire the VPN dedicated mapping table or access to the VPN network, thus ensuring the security of the VPN.

There may be a plurality of VPN dedicated mapping tables, each of which has a VPN identifier: VPN_ID, such a network can support a plurality of VPNs, to meet the application needs of many enterprise networks.

The mapping relationship of the client host in the VPN dedicated mapping table can be dynamically added or deleted.

When the attribute of the VPN to which the user accesses is set in the ASN, the attribute should comprise the identifier of the belonged VPN: VPN_ID, thus conveniently to inquire the mapping table including the VPN identifier VPN_ID in the mapping plane.

The attribute of the user accessed VPN may be fixedly configured in the ASN, and also may be acquired from the mapping plane 300.

The VPN technical solution provided by the existing operators can be implemented in the forwarding plane, for example, the MPLS VPN technology provides the data streams with the secure forwarding and the QOS guarantees, which, when combined with VPN technical schemes in the present invention, may prevent counterfeiting, tampering and other attacks that harm the VPN network in the traditional methods by authenticating the identity identifier of the peer end user, and can provide higher security, meanwhile, uniqueness of the identity identifier guarantees supporting the user's mobile access, supporting the roaming users to securely access to the VPN network at any time, which is particularly beneficial for the corporate users in travel.

Figure 3:
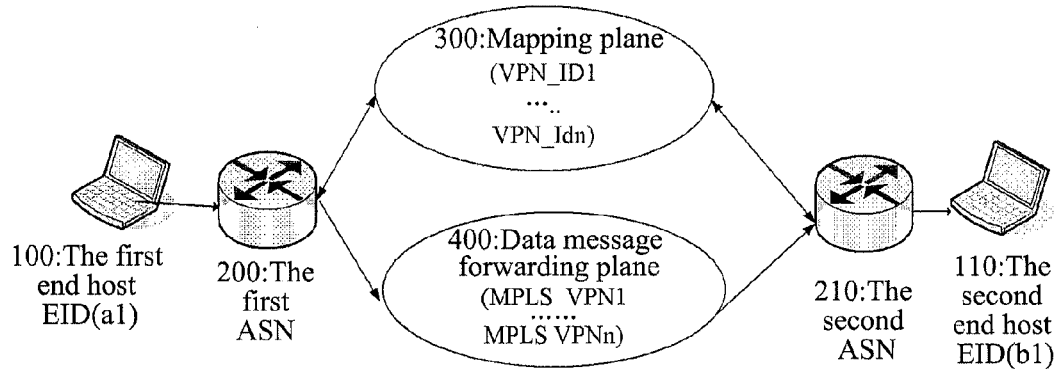
FIG. 3 is a schematic diagram of implementing the virtual private network in the identity and location separation network described in FIG. 2.

A schematic diagram of an application example of the identity and location separation network architecture implementing the VPN is as shown in FIG. 3.

The VPN dedicated mapping table example:

The first virtual private network is allocated with the VPN identifier VPN_ID_(1), and its own VPN dedicated mapping table is as follows:

| | |
|---|---|
| Identity identifier EID (a1) | LID (a1) |
| Identity identifier EID (b1) | LID (b1) |
| ... | ... |
| Identity identifier EID (k1) | LID (k1) |

The second virtual private network is allocated with the VPN identifier VPN_ID_(2), and its own dedicated VPN mapping table is as follows:

| | |
|---|---|
| Identity identifier EID (a2) | LID (a2) |
| Identity identifier EID (b2) | LID (b2) |
| ... | ... |
| Identity identifier EID (k2) | LID (k2) |

Sine the VPNs need to be isolated with each other and not be interconnected, the mapping table entries of the VPN identifier VPN_ID_(1) cannot overlap with the mapping table entries of the VPN identifier VPN_ID_(2).

Figure 4:
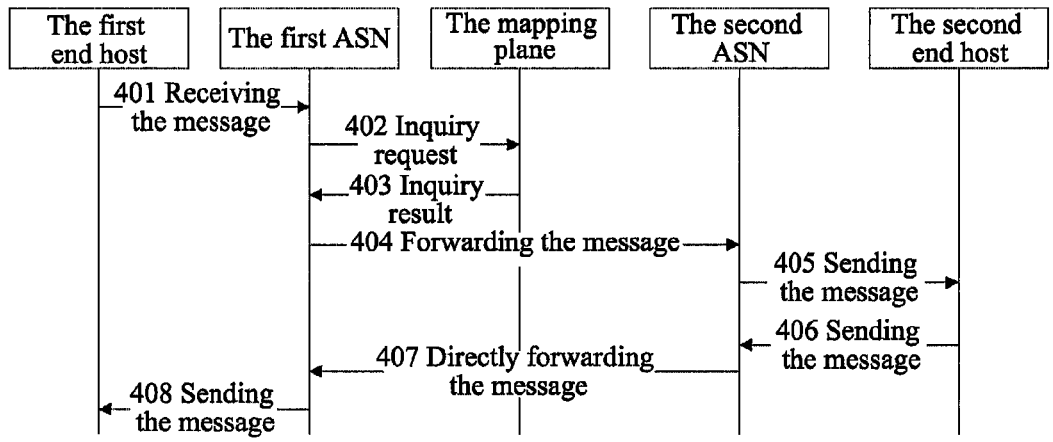
FIG. 4 is a flow chart of an application example of processing data packet in the network architecture shown in FIG. 3.

The procedure of processing the data message is described below, as shown in FIG. 4.

Step 401, the first ASN receives the message sent by the first end host to the second end host, wherein, the sent message contains the identity identifier EID (a1) of the first end host.

Step 402, the first ASN determines that the first end host is a VPN user and belongs to the VPN whose VPN identifier=VPN_ID_(1) according to the VPN attribute table, and the first ASN sends a inquiry request to the mapping plane, wherein, the request carries the VPN attribute (might only comprising the VPN identifier) of the first end host and the destination identity identifier.

Step 403, the mapping plane inquires the VPN dedicated mapping table whose VPN identifier is VPN_ID_(1) according to the destination identity identifier and returns the inquiry result to the first ASN.

Step 404, the first ASN processes the message based on the inquiry result. If the destination identity identifier is the EID (a2) and the peer end does not exist in the inquiry result returned from the mapping plane, the peer end is invalid and cannot have a communication, and it is ensured that only the VPN internal users can communicate with each other; if the destination identity identifier is EID (b1) and the inquiry result returned from the mapping plane is LID (b1), the first ASN normally forwards the message to the forwarding plane, if the forwarding plane supports the existing VPN technology, the corresponding relationship between the VPN identifier of the forwarding plane (MPLS VPN1) and the VPN identifier VPN_ID_(1) in the present invention may be established, providing the quality assurance to the security and QoS (Quality of Service) of the data message in the forwarding plane.

Step 405, the second ASN of the communication peer end receives the message encapsulated with its own LID (b1) address, decapsulates the message and forwards the decapsulated EID(b1) message to the second end host in the downlink, meanwhile, the second ASN learns the message source LID (b1)-EID (b1) mapping relationship as well as the VPN attribute.

Step 406, the second ASN receives the message sent by the second end host to the first end host.

Step 407, since the EID (b1)-LID (b1) mapping relationship as well as the VPN attribute have been learned by the second ASN of the peer end in the above process, the second ASN must be able to locally search out the mapping relationship, and do not need to inquire the VPN identifier VPN_ID_ (1) VPN dedicated mapping table of the mapping plane, and at the moment the LID (a1) is directly encapsulate in the second ASN and the message is forwarded to the first ASN.

Step 408, the message is returned to the first ASN via the forwarding plane, and is sent to the first end host after the first ASN decapsulates the message.

Figure 5:
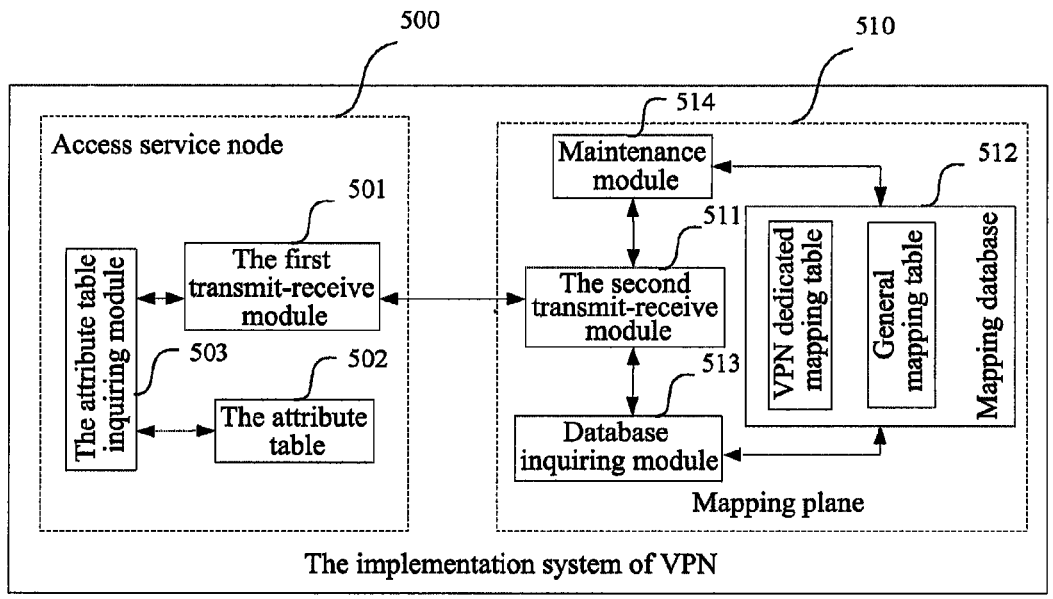
FIG. 5 is a schematic diagram of a module structure of the implementation system of the virtual private network in accordance with an example of the present invention.

To achieve the above method, the present invention also provides an implementation system of virtual private network, as shown in FIG. 5, the implementation system of the virtual private network (VPN) comprises the service access node (ASN) 500 and the mapping plane 510 that are connected through the network, the ASN500 comprises the first transmit-receive module 501, the attribute table 502 and the attribute table inquiring module 503, wherein:

said first transmit-receive 501 is set to: receive a message carrying the identity identifier of the source end host and the identity identifier of the destination end host sent by a source end host, and notify the attribute table inquiring module 503; and forward the message or send an inquiry request to the mapping plane 510, wherein, the message or the inquiry request carries the attribute of the source end host and the identity identifier of the destination end host; when sending the inquiry request to the mapping plane 510, the first transmit-receive module is further set to receive an inquiry result sent by the mapping plane 510, if the mapping relationship of the destination end host is found, forward the message according to the inquiry result, otherwise, the communication fails; the first transmit-receive module is further set to send the registration or cancellation request to the mapping plane 510 when the mapping relationship changes;

the attribute table 502 is set to: store the corresponding relationship between the end host and attribute thereof;

the attribute inquiring module 503, connected with the first transmit-receive module 501 and the attribute table 502, is set to inquire the attribute table 502 according to the identity identifier of the source end host to obtain the attribute of the source end host, and notify the first transmit-receive module 501;

the mapping plane 510 comprises the second transmit-receive module 511, the mapping database 512, the database inquiring module 513, and the maintenance module 514, wherein:

the second transmit-receive module 511 is set to: receive the forwarded message or the sent inquiry request by the ASN 500, and notify the database inquiring module 513; when receiving the inquiry request, send an inquiry result to the ASN 500; when receiving the forwarded message, if the mapping relationship of the destination end host is found, forward the message according to the inquiry result, otherwise, the communication fails; the second transmit-receive module 511 is further set to receive the registration or cancellation request from the ASN500;

the mapping database 512 is set to: store a VPN dedicated mapping table and a general mapping table, wherein, the VPN dedicated mapping table comprises an identity identifier-location identifier mapping relationship of VPN end hosts in the same VPN, the general mapping table comprises the host identity identifier-location identifier mapping relationship of a general end;

the database inquiring module 513, connected with the second transmit-receive module 511 and the mapping database 512, is set to inquire the VPN dedicated mapping table or the general mapping table consistent with the attribute of the source end host according to the identity identifier of the destination end host, and notify the second transmit-receive module of the inquiry result.

For the case that there is only one VPN dedicated mapping table, the attribute means whether the end host is a VPN end host or not, if the attribute of the source end host indicates that the source end host is a VPN end host, the database inquiring module of the mapping plane inquires the VPN dedicated mapping table, otherwise, the database inquiring module inquires the general mapping table.

For the case that there are a plurality of VPN dedicated mapping tables, different VPN dedicated mapping tables correspond to different VPNs and have different VPN identifiers; the attribute indicates whether the end host is a VPN end host or not, and the identifier of the belonged VPN if the end host is a VPN end host; if the attribute of the source end host indicates that the source end host is a VPN end host, the database inquiring module 513 of the mapping plane inquires the VPN dedicated mapping table corresponding to the VPN identifier, otherwise, database inquiring module 513 inquires the general mapping table.

The maintenance module 514, connected with the second transmit-receive module 511 of the mapping plane, the general mapping table and the VPN dedicated mapping table (that is, the mapping database 512), is set to add or delete the mapping relationship in the general mapping table or the VPN dedicated mapping table according to the registration or cancellation request from the ASN500.

In the present invention, the VPN dedicated mapping table of the VPN is stored in the mapping plane in the identity and location separation network, and it is determined whether to achieve the communication between the VPN end host users in the VPN or not according to the VPN dedicated mapping table, thereby the VPN is efficiently achieved in the identity and location separation network, meeting the user requirements for the VPN, eliminating the influence of the identity and location separation technical solution on the traditional VPN service, and reducing the changes on the existing devices and software tools due to the implementation of VPN, especially for the PP-VPN solution, and the method of the present invention is achieved via the mapping plane and is one of the PP-VPN solutions.

Those skilled in the field should understand that, some or all steps in the aforementioned method might be implemented by the programs instructing the related hardware tools, and the programs can be stored in a computer readable storage medium, such as read-only memory, disk or CD-ROM. Optionally, some or all steps of the aforementioned embodiment can be implemented with one or more integrated circuits. Correspondingly, each module/unit in the aforementioned embodiment might be implemented in the form of hardware or software function modules. The present invention is not limited to any specific combination of hardware and software.

Although the present invention is described with combination of specific embodiments, without departure from the spirit and essence of the present invention, those skilled in the field can make various modifications and variations according to the present invention, and these modifications and variations should belong to the scope of the claims of the present invention.

INDUSTRIAL APPLICABILITY

In the implementation method and system of the VPN provided in the present invention, the VPN dedicated mapping table of the VPN is stored in the mapping plane in the identity and location separation network, and it is determined whether to achieve the communication between the VPN end host users in the VPN or not according to the VPN dedicated mapping table, thereby the VPN is efficiently achieved in the identity and location separation network, meeting the user requirements for the VPN, eliminating the influence of the identity and location separation technical solution on the traditional VPN service, and reducing the changes on the existing devices and software tools due to the implementation of VPN.

What is claimed is:

1. An implementation method of virtual private network (VPN) wherein the VPN is implemented based on an identity and location separation network which comprises an access service node (ASN) and a mapping server which are connected through the network, and the method comprises:
    setting a VPN dedicated mapping table and a general mapping table of the VPN in a mapping server of the identity and location separation network, wherein the VPN dedicated mapping table comprises an identity identifier-location identifier mapping relationship of VPN end hosts in the same VPN, the general mapping table comprises the host identity identifier-location identifier mapping relationship of a general end;
    the ASN receiving a message carrying the identity identifier of the source end host and the identity identifier of the destination end host sent by the source end host;
    the ASN inquiring an VPN attribute table according to the identity identifier of the source end host to obtain the attribute of the source end host, and forwarding the message or sending an inquiry request to the mapping server, wherein the message or the request carries the attribute of the source end host and the identity identifier of the destination end host; and
    the mapping server inquiring the VPN dedicated mapping table or the general mapping table consistent with an attribute of a source end host according to the identity identifier of a destination end host, if the mapping relationship of the destination end host is found, the ASN or the mapping server forwarding the message to the destination access service node corresponding to a destination location identifier to achieve the communication, if the mapping relationship of the destination end host is not found, the communication failing.

2. The method of claim 1 wherein:
    the attribute indicates whether the end host is a VPN end host or not; and
    in the step of the mapping server inquiring the VPN dedicated mapping table or the general mapping table consistent with an attribute of a source end host according to the identity identifier of a destination end host, if the attribute of the source end host indicates that the source end host is a VPN end host, the mapping server inquires the VPN dedicated mapping table; if the attribute of the source end host indicates that the source end host is not a VPN end host, the mapping server inquires the general mapping table.

3. The method of claim 1 wherein:
    the mapping server comprises a plurality of VPN dedicated mapping tables, different VPN dedicated mapping tables correspond to different VPNs and have different VPN identifiers;
    the attribute indicates whether the end host is a VPN end host or not, and indicates the VPN identifier of the end host when the end host is a VPN end host; and
    in the step of the mapping server inquiring the VPN dedicated mapping table or the general mapping table consistent with an attribute of a source end host according to the identity identifier of a destination end host, if the attribute of the source end host indicates that the source end host is a VPN end host, the mapping server inquires the VPN dedicated mapping table corresponding to the VPN identifier; if the attribute of the source end host indicates that the source end host is not a VPN end host, the mapping server inquires the general mapping table.

4. The method of claim 1 wherein, after the step of the ASN or the mapping server forwarding the message to the destination access service node corresponding to a destination location identifier to achieve the communication, the method further comprises:
    when the destination access service node receives the message and forwards to the destination end host, meanwhile, the destination access service node recording the identity identifier-location identifier mapping relationship of the source end host as well as the VPN attribute of the source end host in a local mapping table; after the destination access service node receives the message sent back from the destination end host, the destination access service node inquiring the local mapping table, and directly forwarding the message when the attribute of the source end host is determined to be the same as the destination end host.

5. An implementation method of a virtual private network (VPN) wherein the VPN is achieved based on an identity and location separation network which comprises an access service node (ASN) and a mapping server which is connected through the network, the method comprising:
    setting a VPN dedicated mapping table in a mapping server of the identity and location separation network, wherein, the VPN dedicated mapping table comprises an identity identifier-location identifier mapping relationship of VPN end hosts in the same VPN;
    the ASN receiving a message carrying the identity identifier of the source end host and the identity identifier of the destination end host sent by the source end host;
    the ASN inquiring an VPN attribute table according to the identity identifier of the source end host to obtain the attribute of the source end host, and forwarding the message or sending an inquiry request to the mapping server, wherein, the message or the request carries the attribute of the source end host and the identity identifier of the destination end host; and the mapping server inquiring the VPN dedicated mapping table, if the mapping relationship of a destination end host is found, the ASN or the mapping server forwarding the message to the destination access service node corresponding to a destination location identifier to achieve the communication, if the mapping relationship of the destination end host is not found, the communication failing.

6. The method of claim 5 wherein:

a plurality of VPN dedicated mapping tables are set simultaneously in the mapping server, wherein, different VPN dedicated mapping tables correspond to different VPNs and have different VPN identifiers; and the mapping server inquires the VPN dedicated mapping table consistent with the source end host VPN identifier according to the identity identifier of the destination end host, if the mapping relationship of the destination end host is found, the identity and location separation network achieves communication between the source end host and the destination end host, otherwise, the communication fails.

7. The method of claim 5 wherein, after the step of the ASN or the mapping server forwarding the message to the destination access service node corresponding to a destination location identifier to achieve the communication, the method further comprises:

when the destination access service node receives the message and forwards to the destination end host, meanwhile, the destination access service node recording the identity identifier-location identifier mapping relationship of the source end host as well as the VPN attribute of the source end host in a local mapping table; after the destination access service node receives the message sent back from the destination end host, the destination access service node inquiring the local mapping table, and directly forwarding the message when the attribute of the source end host is determined to be the same as the destination end host.

8. An implementation system of virtual private network (VPN) wherein the system is achieved based on an identity and location separation architecture network, and the system comprises an access service node (ASN) and a mapping server which are connected through network, and the ASN comprises a first transmit-receive module, an attribute table and an attribute table inquiring module, and wherein:

the first transmit-receive module is set to: receive a message carrying the identity identifier of the source end host and the identity identifier of the destination end host sent by a source end host, and notify the attribute table inquiring module; and forward the message or send an inquiry request to the mapping server, wherein, the message or the inquiry request carries the attribute of the source end host and the identity identifier of the destination end host; when sending the inquiry request to the mapping server, the first transmit-receive module is further set to receive an inquiry result sent by the mapping server, if the mapping relationship of the destination end host is found, forward the message according to the inquiry result, otherwise, the communication fails;

the attribute table is set to: store the corresponding relationship between the end host and attribute thereof;

the attribute inquiring module, connected with the first transmit-receive module and the attribute table, is set to inquire the attribute table according to the identity identifier of the source end host to obtain the attribute of the source end host, and notify the first transmit-receive module;

the mapping server comprises a second transmit-receive module, a mapping database and a database inquiring module, wherein:

the second transmit-receive module is set to: receive the forwarded message or the sent inquiry request by the ASN, and notify the database inquiring module; when receiving the inquiry request, send an inquiry result to the ASN; when receiving the forwarded message, if the mapping relationship of the destination end host is found, forward the message according to the inquiry result, otherwise, the communication fails;

the mapping database is set to: store a VPN dedicated mapping table and a general mapping table, wherein, the VPN dedicated mapping table comprises an identity identifier-location identifier mapping relationship of VPN end hosts in the same VPN, the general mapping table comprises the host identity identifier-location identifier mapping relationship of a general end;

the database inquiring module, connected with the second transmit-receive module, is set to inquire the VPN dedicated mapping table or the general mapping table consistent with the attribute of the source end host according to the identity identifier of the destination end host, and notify the second transmit-receive module of the inquiry result.

9. The system of claim 8 wherein:

the attribute indicates whether the end host is a VPN end host or not; and the database inquiring module of the mapping server is set to: if the attribute of the source end host indicates that the source end host is a VPN end host, inquire the VPN dedicated mapping table; if the attribute of the source end host indicates that the source end host is not a VPN end host, inquire the general mapping table.

10. The system of claim 8 wherein:

the mapping database of the mapping server comprises a plurality of VPN dedicated mapping tables, different VPN dedicated mapping tables correspond to different VPNs and have different VPN identifiers;

the attribute indicates whether the end host is a VPN end host or not, and indicates the VPN identifier of the end host when the end host is a VPN end host; and the database inquiring module of the mapping server is set to: if the attribute of the source end host indicates that the source end host is a VPN end host, inquire the VPN dedicated mapping table corresponding to the VPN identifier; if the attribute of the source end host indicates that the source end host is not a VPN end host, inquire the general mapping table.

* * * * *